United States Patent [19]

Ohkubo et al.

[11] 4,191,876
[45] Mar. 4, 1980

[54] MICROWAVE OVEN HAVING RADIATION DETECTOR

[75] Inventors: Masaru Ohkubo, Yamatokoriyama; Tadayuki Onoda, Neyagawa, both of Japan

[73] Assignee: Matsushita Electric Industrial Co., Ltd., Osaka, Japan

[21] Appl. No.: 923,157

[22] Filed: Jul. 10, 1978

[30] Foreign Application Priority Data

Jul. 15, 1977 [JP] Japan .................................. 52-85502

[51] Int. Cl.² ............................................. H05B 9/06
[52] U.S. Cl. ............................ 219/10.55 B; 73/355 R;
219/10.55 F
[58] Field of Search ................. 219/10.55 B, 10.55 F,
219/10.55 M, 10.55 R; 73/355 R

[56] References Cited

U.S. PATENT DOCUMENTS

| | | | |
|---|---|---|---|
| 3,501,380 | 3/1970 | Perch | 73/355 R |
| 3,875,361 | 4/1975 | Fukui et al. | 219/10.55 B |
| 4,106,340 | 8/1978 | Hamid | 73/355 R |
| 4,115,678 | 9/1978 | Tachikawa et al. | 219/10.55 B |
| 4,132,878 | 1/1979 | Tachikawa et al. | 219/10.55 B |

*Primary Examiner*—Arthur T. Grimley
*Attorney, Agent, or Firm*—Burgess, Ryan and Wayne

[57] ABSTRACT

A microwave oven is provided with a turntable for turning food and a radiation detection device for detecting radiation emitted from food without making contact with it so as to control its temperature. The radiation detecting device includes a radiation detector and a scanning reflecting mirror which linearly scans the turntable diametrically thereof and re-directs a beam of radiation through a chopper to the radiation detector. Because of the composition of the rotation of the turntable and the scanning movement of the reflecting mirror and of the chopper, a temperature at a very small spot on food may be detected so that regardless of the kind, shape and volume of food on the turntable, the temperature of food may be always detected with a higher degree of accuracy.

5 Claims, 4 Drawing Figures

MICROWAVE OVEN HAVING RADIATION DETECTOR

BACKGROUND OF THE INVENTION

The present invention relates to a microwave oven having a radiation detecting device.

In general, conventional microwave ovens employ a temperature detection system wherein a temperature sensor probe is inserted into food so as to directly measure the temperature within food, thereby controlling the temperature of the oven.

However, with the temperature sensor probe it is difficult to measure the temperature of food and vegetable small in size. Furthermore when a plurality of foods are placed in the oven, it is impossible to control the over-all temperature. The sensitivity of the temperature sensor probe is not satisfactoty. Moreover, utility of such a probe is low because it is cumbersome to insert the probe into food.

As disclosed in U.S. Pat. No. 2,595,748, there has been devised and demonstrated an oven temperature control system wherein the temperature of food is measured in terms of a quantum of radiation emitted therefrom. However, this system has a problem that the detection range of a radiation detector is limited so that the temperature control is affected by the shape of food.

In order to overcome this problem, there has been devised a system, as disclosed in Japanese Utility Model Laid-Open No. 51-126441, wherein a radiation or temperature sensor is scanned. However, since the temperature sensor is scanned, the accuracy in detection is not satisfactory, noise is generated and lifetime is short. When this system is applied to an oven having a turntable, it is very difficult to attain synchronization between the rotation of the turntable and the swinging movement of the temperature sensor so that the reduction to practice is almost impossible.

SUMMARY OF THE INVENTION

One of the objects of the present invention is therefore to provide a microwave oven having a turntable and a radiation detecting device which may detect the temperatures at very small spots on food on the turntable without making direct contact with food, whereby the oven temperature may be correctly controlled independently of kind, shape and volume of food.

Another object of the present invention is to provide a microwave oven of the type described in which the radiation detecting device includes a radiation detector and a reflecting mirror which may linearly scan the turntable diametrically thereof and re-direct a beam of radiation emitted from a scanned spot on food to the radiation detector through a chopper, whereby the oven temperature control may be attained with a higher degree of accuracy.

A further object of the present invention is to provide a microwave oven of the type described above wherein the reflecting mirror and the turntable are driven by a common motor so that synchronization between them may be ensured.

A still further object of the present invention is to provide a microwave oven of the type described above wherein the scanning speed of the reflecting mirror may be arbitarily selected so that the degree of accuracy in radiation detection may be suitably controlled.

To the above and other ends, the present invention provides a microwave oven of the type for controlling the microwave output in response to the detection of radiation emitted from food being heated, characterized by the provision of a turntable upon which is placed food, a reflecting mirror for linearly scanning said turntable diametrically thereof, the scanning velocity of said reflecting mirror being synchronized with the rotational speed of said turntable, a chopper for chopping a beam of radiation reflected from said reflecting mirror, and a radiation detector for receiving the chopped radiation beam transmitted through said chopper and generating a signal representative of the difference between the amount of radiation emitted from food on said turntable and the amount of radiation transmitted through or chopped by said chopper.

DESCRIPTION OF THE PREFERRED EMBODIMENT

Figure 1:
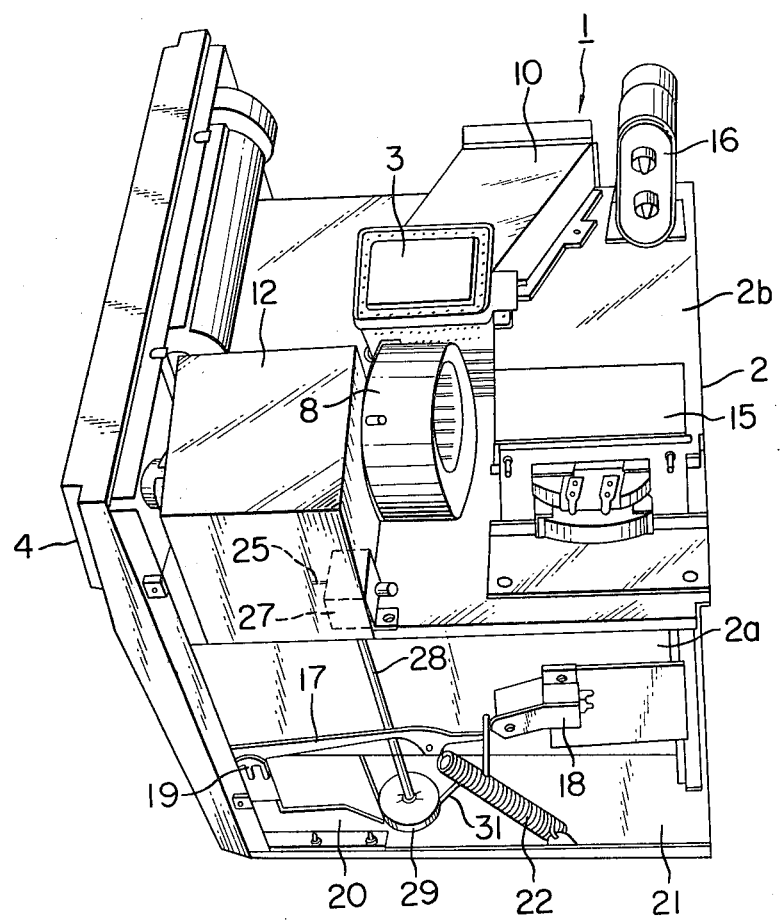
FIG. 1 is a perspective view of a preferred embodiment of a microwave oven in accordance with the present invention with outer covers removed.
Figure 2:
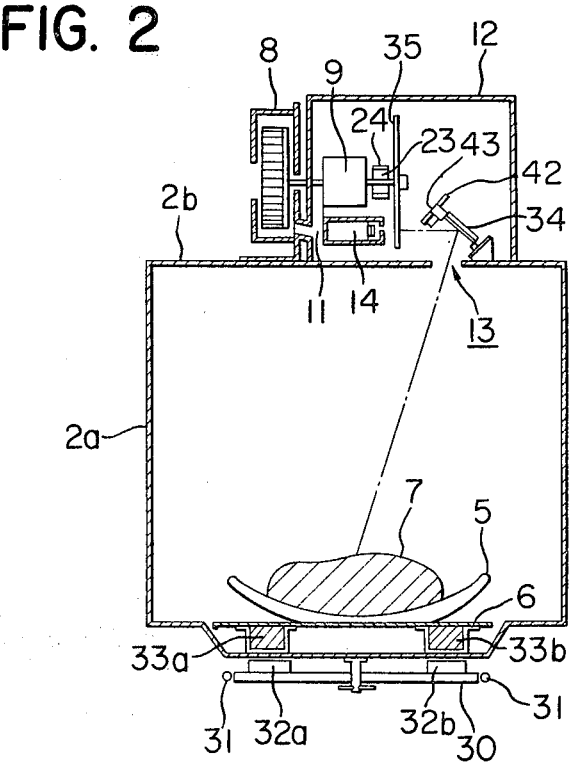
FIG. 2 is a vertical sectional view thereof.

Referring to FIGS. 1 and 2, a microwave oven in accordance with the present invention has an oven 2 defined by side walls 2a, a top plate 2b, a bottom plate 21, a front control panel 4 and a door (not shown). A turntable 6 is disposed within the oven 2 for rotation as will be described in detail hereinafter and a food container 5 containing food 7 is placed upon the turntable 6.

A microwave energy source or a magnetron 3 is mounted on the top plate 2b and is powered through a step-up transformer 15 and a voltage doubler 16.

A magnetron cooling fan 8 is mounted on the top plate 2b and is driven by a motor 9. After having cooled the magnetron 3, the cooling air flows into the oven 2 through an air duct 10.

Part of the air blown by the cooling fan 8 is directed to flow through an air passage 11 into an infrared or radiation detector cover 12 and then into the oven 2 through a detection or a scanning hole 13 formed through the top plate 2b as best shown in FIG. 2. This cooling air bypassing arrangement is provided in order to avoid the degradation in sensitivity of the radiation detecting device or system due to steam, oil and smoke emitted from food 7 in the oven 2.

A door arm 17 which is operatively coupled to the door (not shown) is slidably supported by a door arm roller 19 which in turn is supported by a roller support 20. When the door is opened, the door arm 17 is so actuated as to open a door switch 18, thereby disconnecting the power supply from the step-up transformer 15 so that the magnetron 3 may be de-energized. A door spring 22 is loaded between the door arm 17 and the bottom plate 21 so as to prevent the door from being readily opened.

Figure 3:
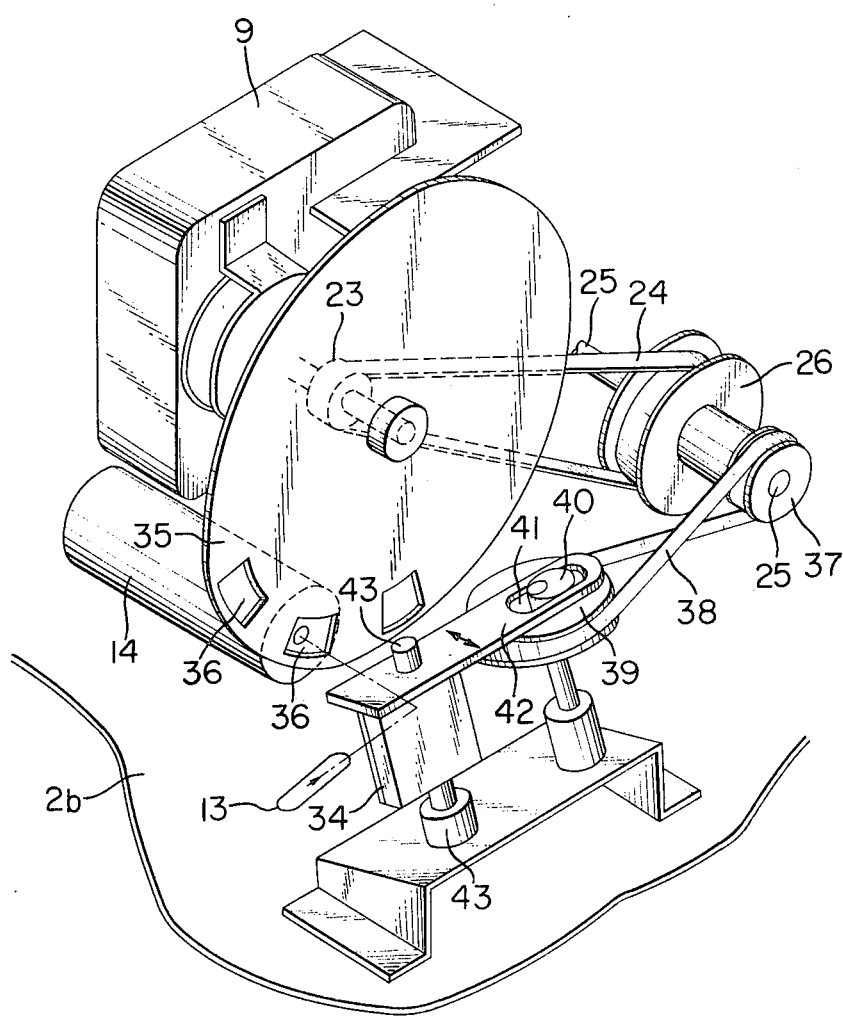
FIG. 3 is a fragmentary perspective view, on an enlarged scale, thereof.

Next with further reference to FIG. 3, a mechanism for rotating the turntable 6 will be described. A pulley 23 attached to the driving shaft of the motor 9 at the end opposite to the cooling fan 8 is drivingly coupled with an endless belt 24 to a pulley 26 carried by a shaft 25 (See FIG. 3). As shown in FIG. 1, the shaft 25 is coupled through a reduction gear 27, a vertical shaft 28 carrying a pulley 29 which in turn is drivingly coupled with an endless belt 31 to a pulley 30 (See FIG. 2). Magnets 32a and 32b which are mounted on the upper surface of the pulley 30 attract magnets 33a and 33b attached on the undersurface of the turntable 6 so that the turntable 6 is rotated in unison with the pulley 30.

Next, still referring to FIGS. 1, 2 and 3, an infrared detector 14; that is, the mode of detecting the temperature of food on the turntable 6 will be described. Infrared rays radiated from food pass through the detection hole 13 formed through the top plate 2b and is redirected by a reflecting mirror 34 to pass through openings 36 of a chopper 35 carried by the driving shaft of the motor 9 so as to be intercepted by the infrared detector 14.

The shaft 25 which is driven by the motor 9 in the manner described above, carries another pulley 37 which in turn is drivingly coupled with a quarter-turn belt 38 to a pulley 39. A cam 40 is eccentrically attached to the shaft of the pulley 39 is fitted into an elongated slit 41 of a lever 42 which is pivoted with a pivot pin or shaft 43 on which is securely mounted the reflecting mirror 34. Therefore, upon rotation of the pulley 39, the lever 42 is caused to swing about the pivot pin 43 in the directions indicated by a double-pointed arrow (a) in FIG. 3. As a result, the reflecting mirror 34 is also caused to move in unison with the lever 42 so that it scans the turntable 6 in the diametrical directions thereof, always passing the center thereof.

Figure 4:
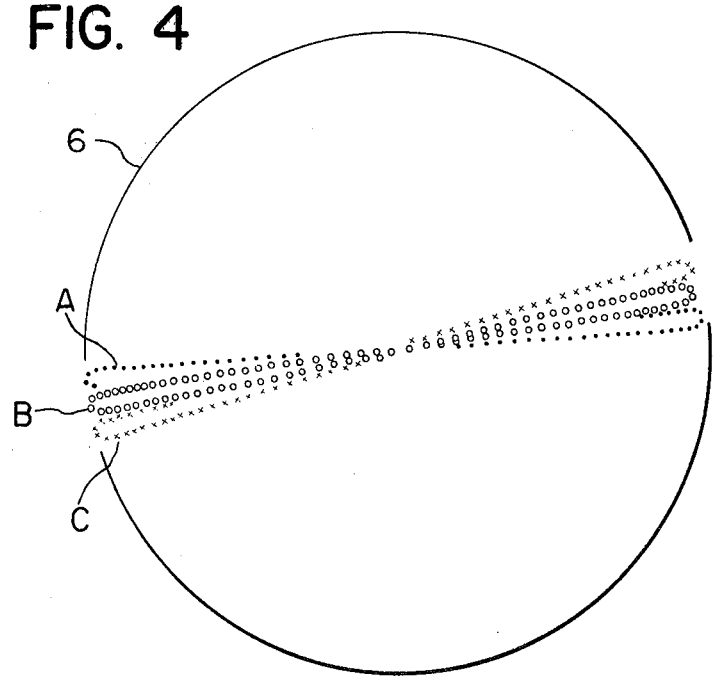
FIG. 4 shows the traces on the turntable scanned by a reflecting mirror.

FIG. 4 shows the scanning paths, which are the composition of the scanning movement of the reflecting mirror 34 and the rotation of the turntable 6. In FIG. 4, the first scanning path is indicated by A or by black dots; the second scanning path, by B or white dots; and the third scanning path, by C or by x. In like manner, the whole surface of the turntable 6 may be scanned. The scanning frequency is the product of the rotational speed of the motor 9 and the number of openings 36 of the chopper 35. Each of the black and white dots and crosses x shown in FIG. 4 corresponds to a time when the center of each opening 36 of the chopper 35 is in line with the infrared detector 14.

According to this embodiment, when the turntable 6 makes a half rotation, the whole surface thereof is scanned, but it is to be understood that the infrared detection system may be so arranged that the whole surface of the turntable 6 may be scanned whenever the turntable 6 makes one rotation. That is, in the first half rotation, the odd-number lines; that is, the first line A, the third line C, the fifth line and so on are scanned and in the last half rotation, the even-numbered lines; that is, the second line B, the fourth line, the sixth line and so on, are scanned. Thus, in one rotation of the turntable 6, the whole surface thereof may be scanned.

The infrared detector 14 generates a signal representative of the difference between the amount of infrared radiation from food 7 and the amount of infrared radiation chopped by the chopper 35 or the difference between the temperature of food 7 and the temperature of the chopper 35 which is rotating. In response to the average value or the crest value of the signal thus derived, the microwave output is controlled.

What is claimed is:

1. A microwave oven with a radiation detecting device of the type for controlling the microwave output in response to the detected radiation from food characterized by the provision of
    (a) a turntable upon which food to be heated is placed,
    (b) a reflecting mirror for scanning said turntable linearly in the diametrical direction thereof, the rotational speed of said reflecting mirror being in synchronism with that of said turntable,
    (c) a chopper for interrupting the beam of radiation redirected by said reflecting mirror, and
    (d) a radiation detector for intercepting the beam of radiation transmitted through said chopper, thereby generating the signal representative of the difference between the amount of radiation from said food and the amount of radiation chopped by or transmitted through said chopper.

2. A microwave oven with a radiation detecting device as set forth in claim 1 further characterized in that a common electric motor is used for driving both said reflecting mirror and said turntable.

3. A microwave oven with a radiation detecting device as set forth in claim 2 further characterized in that said common motor is the one that is used for driving a cooling fan for an magnetron.

4. A microwave oven with a radiation detecting device as set forth in claim 1 further characterized in that said reflecting mirror is so constructed and arranged as to scan the whole surface of said turntable for every one half rotation thereof.

5. A microwave oven with a radiation detecting device as set forth in claim 1 further characterized in that said reflecting mirror is so constructed and arranged as to scan the whole surface of said turntable for every one rotation thereof.

* * * * *